(12) United States Patent
Quackenboss et al.

(10) Patent No.: US 8,348,547 B2
(45) Date of Patent: Jan. 8, 2013

(54) WATERPROOF ROADBED CONSTRUCTION

(76) Inventors: John S. Quackenboss, Falls Church, VA (US); Earl F. Lockwood, Farmville, VA (US); Thomas R. Lujan, Minnetonka, MN (US); Dennis K. Stone, Richmond, VA (US); James P. Sweeney, Sterling, VA (US)

( * ) Notice: Subject to any disclaimer, the term of this patent is extended or adjusted under 35 U.S.C. 154(b) by 100 days.

(21) Appl. No.: 13/066,295

(22) Filed: Apr. 12, 2011

(65) Prior Publication Data
US 2012/0263529 A1 Oct. 18, 2012

(51) Int. Cl.
*E01C 7/00* (2006.01)
(52) U.S. Cl. .......................................... 404/76; 427/136
(58) Field of Classification Search ............... 404/27, 404/31, 75, 76; 427/136; 252/88.1, 88.2; 405/264
See application file for complete search history.

(56) References Cited

U.S. PATENT DOCUMENTS

| | | | | | |
|---|---|---|---|---|---|
| 4,073,972 | A | * | 2/1978 | Nestler et al. | 427/136 |
| 4,342,796 | A | * | 8/1982 | Brown et al. | 427/136 |
| 4,835,014 | A | * | 5/1989 | Roth et al. | 427/299 |
| 5,661,196 | A | * | 8/1997 | Mayer et al. | 523/122 |
| 6,506,444 | B1 | * | 1/2003 | Mahr et al. | 427/138 |
| 2012/0207551 | A1 | * | 8/2012 | Guilbault et al. | 405/263 |

* cited by examiner

*Primary Examiner* — Gary S Hartmann
(74) *Attorney, Agent, or Firm* — John L. Sotomayor (57) ABSTRACT

A process for hardening and rendering a roadbed water resistant by measuring and ensuring the clay content of the roadbed soil is a minimum of 12%, amending the soil to bring the clay content within this range. Treating the top six inches of the roadbed soil with an enzyme formulation and removing and setting aside the treated roadbed soil. Applying two mixtures of organo-silane solution to soil remaining in the roadbed in two separate steps, allowing the treated soil to cure between applications. Adding the enzyme treated soil back onto the roadbed, compacting and crowning the soil, then spraying the surface of the treated roadbed and its associated shoulders with the organo-silane mixture. Once again, the organo-silane mixture is applied in a two step process with two different dilutions of the organo-silane formulation to form a hardened and water resistant envelope of soil within the roadbed.

20 Claims, 11 Drawing Sheets

WATERPROOF ROADBED CONSTRUCTION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. The name, DuroEarth™, has been applied for as a registered trademark with the US Patent and Trademark Office, Ser. No. 85/231/181. Additional trademarks are the property of their respective owners.

BACKGROUND

The damaging effects of water are the largest contributor to roadbed deterioration and produce significant maintenance issues for finished roadways. High moisture content in the soil of a roadbed may be due to large volumes of water introduced either through precipitation or capillary action from below. Limiting the introduction of water by creating a hardened and water resistant soil roadbed will:
1. Maintain a roadbed's soil strength near maximum compaction density;
2. Greatly reduce the thermal expansion and contraction of a soil's clays, thereby significantly reducing potholes and road surface cracking;
3. Prevent erosion of both roadbed and shoulders;
4. Reduce maintenance costs associated with the repair of roadbeds caused by water damage and excessive moisture content.

BRIEF DESCRIPTION OF THE DRAWINGS

Certain illustrative embodiments of the DuroEarth™ Process showing the organization and method of operation, together with objects and advantages, may be best understood by referencing detailed descriptions that follow. These embodiments should be taken in conjunction with the accompanying drawings in which.

DETAILED DESCRIPTION

While this invention is susceptible of embodiment in many different forms, there is a process shown in the drawings, and it will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A combination of compounds may be used together to both harden and render the soil of a roadbed hydrophobic. A water-soluble, biodegradable enzyme mix may be used in combination with a water-soluble, organo-silane formulation to produce a strong, hydrophobic, and long-lasting road base. The organo-silane formulation may be used to create a waterproof envelope to encase the enzyme treated road base.

By way of example, and not of limitation, an enzyme mix sold under the trade name of Perma-Zyme® may be used in the process to provide a strong, long-lasting road base. Perma-Zyme® is a concentrated multi-enzyme formulation that alters and stabilizes the properties of soil to increase compaction and produce a strong, long-lasting, water-resistant road base. This enzyme product is a proprietary formulation that has been produced since 1971 and is one of the world's finest products for soil and road stabilization. Developed and proven through many years of field testing, Perma-Zyme® provides additional environmental advantages to road builders. It is non-toxic, non-caustic, non-corrosive and totally biodegradable. When mixed with water and applied prior to compaction, Perma-Zyme® acts upon organic fines contained in the soil through a catalytic bonding process.

Unlike inorganic or petroleum based products which temporarily hold soil materials together, Perma-Zyme® causes the soil to bond during compaction into a dense base which resists weathering and wear from heavy traffic. Organo-silane compounds are currently being manufactured that can make soils, sand, and aggregates repel water. These compounds are available in the market place, and two such examples of these products are currently registered as Zycosoil® and Terrasil®. This technology makes treated soils 98% water resistant and delivers proven results in road construction while sharply reducing soil erosion. Both products are water soluble and are diluted prior to application. The water acts as a carrier for the organo-silane molecules while they penetrate the soil's surface to form covalent bonds with silica and oxygen molecules. By creating a water resistant soil base these compounds minimize the damaging effects of clay's expansion and contraction. Costly maintenance repairs are reduced and the road bed's useful life is lengthened because it is protected from both capillary rise as well as from surface penetration of water.

Hardening agents such as lime and concrete have typically been added to harden the underlying soil in an attempt to stabilize the roadbed and attempt to keep the road from deteriorating due to the action of water in the soil of the roadbed. Hardening agents, such as lime and concrete, are ecologically hard on the land both under and adjacent to the road. Moreover, they are difficult compounds to separate from the soil of a roadbed when repairs or new road construction is necessary. This also makes the disposal of such soil ecologically expensive. Improvements over such hardening agents include polymer and organo-silane compounds, which provide greater water resistance and have less of a deleterious effect upon the environment.

Treating dirt (soil) roads with the combination of a multi-enzyme polymer formulation in combination with organo-silane and/or other polymer compounds for the purpose of waterproofing and hardening them requires a multi-stage process. This multi-stage process ensures that the waterproofing of the soil of the roadbed is accomplished through the formation of siloxane (Si—O—Si), covalent bonds between silica and oxygen and the hardening of the roadbed takes place with the polymers' treatment of the soil. This process adds considerable value to current methods of hardening roads using enzymes because it creates a waterproof envelope that renders roads impermeable for years of use. The exemplary process methodology described herein delivers high quality roads at a fraction of the cost of conventional asphalt or concrete surfaces.

Figure 1:
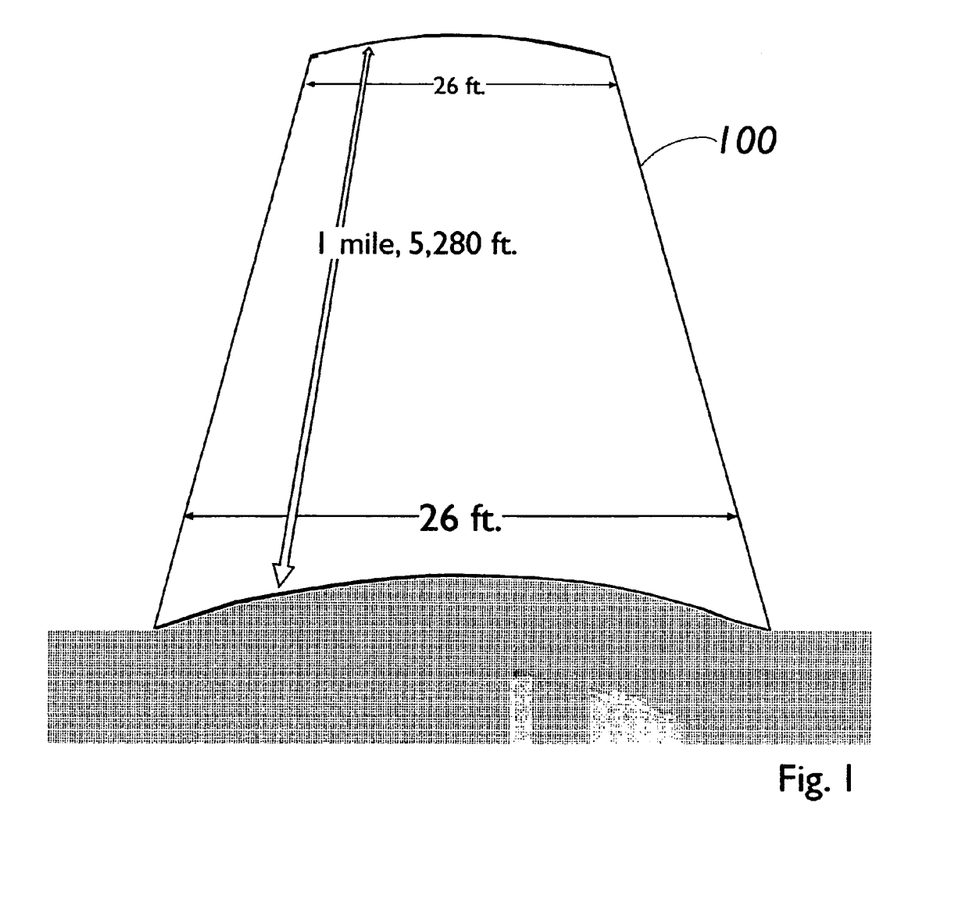
FIG. 1 is an exemplary view of an untreated roadbed prior to amendment consistent with certain embodiments of the present invention.

Turning now to FIG. 1, consistent with certain embodiments of the invention, this figure presents an exemplary view of a mile long segment of unprepared roadbed 100. Standard widths for roadbeds, based upon the number of lanes for the passage of traffic, are commonly known. In this exemplary implementation the roadbed 100 is of sufficient dimension to accommodate two lanes of traffic in each direction as well as a three foot shoulder on each side of the roadbed. The roadbed 100 herein depicted, therefore, will when finished provide the foundation for at least a two lane road in each direction, with a three foot shoulder on each side of the traffic lanes, approximately 1 mile in length.

Figure 2:
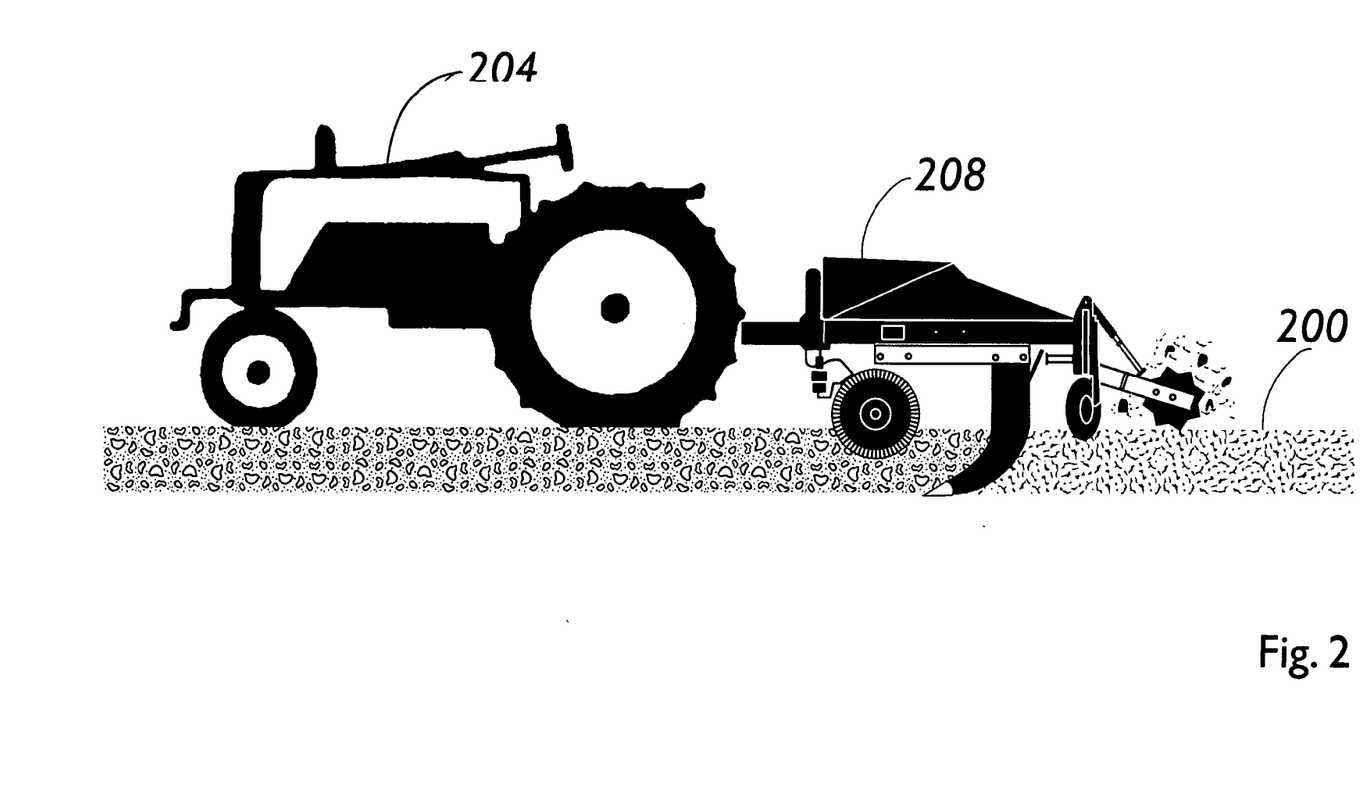
FIG. 2 is an exemplary view of roadbed pre-treatment and preparation consistent with certain embodiments of the present invention.

Turning now to FIG. 2, consistent with certain example embodiments of the invention this figure presents an exemplary view of roadbed pre-treatment and preparation of the soil prior to the amendment of the soil with a hardening agent. In this exemplary implementation, the soil that will form the basis of the roadbed must be tested to determine the clay content of the soil. By way of example, when using a multi-enzyme formulation compound the preferred clay content of the soil is from a minimum of about 12% clay content. When the clay content falls below this exemplary range, clay amendments to the soil must be added to bring the clay content of the soil to within the preferred range. In addition, the soil should be dry to the touch, but it should hold together when squeezed in a handful. Soil amendment processes used to modify soil content to desired range values are well known in the industry and will not be further discussed here.

In this exemplary embodiment, using a high quality tiller or tractor 204 capable of pulling a tiller 208 that is capable of tilling the soil to a depth of twelve inches, may be used to till the soil 200 in the chosen road section. In another non-limiting example, a Caterpillar® RM250 (not shown) may be substituted for the tiller 208 and used to till the soil. In the exemplary embodiment, one tills the soil approximately 6 inches deep until thoroughly loose with all clods being broken up such that the pulverized soil can be saturated with the multi-enzyme formulation.

Figure 3:
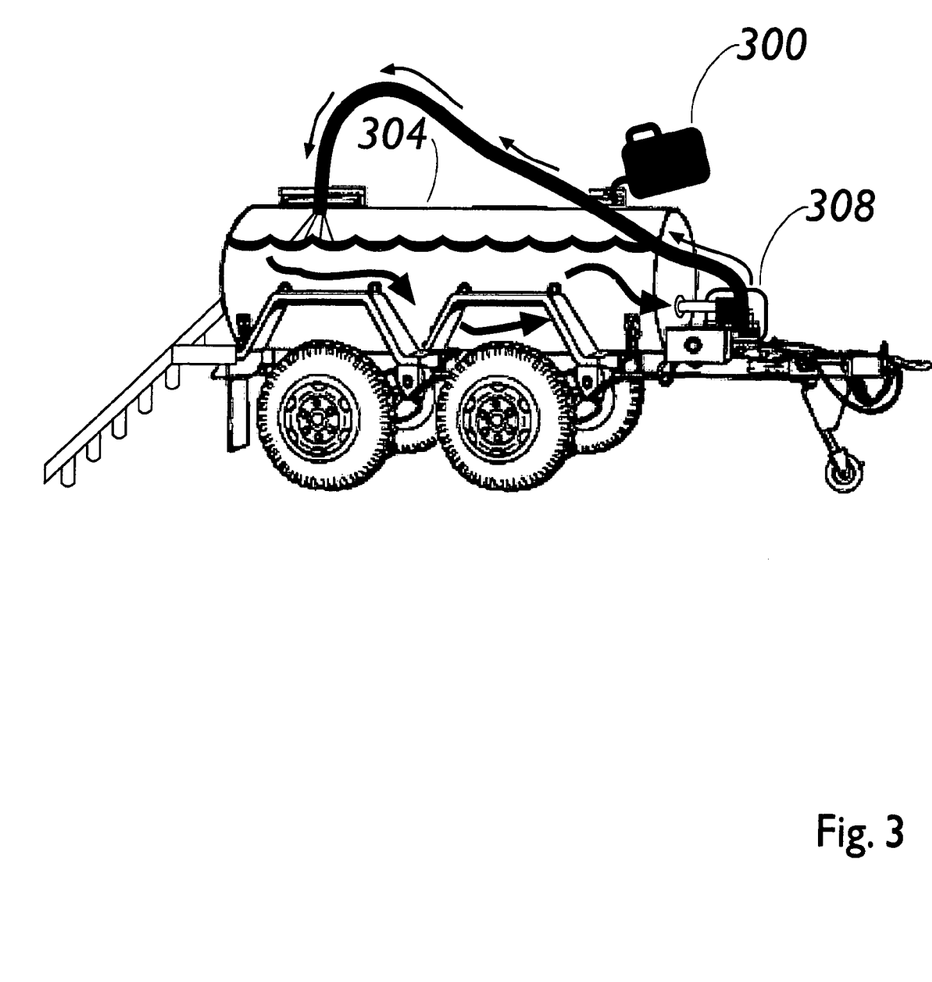
FIG. 3 is an exemplary view of a multi-enzyme amendment and mixture consistent with certain embodiments of the present invention.

Turning to FIG. 3, this figure presents a multi-enzyme formulation and mixture that may be used to treat the roadbed. In a non-limiting example, the enzyme formulation of Perma-Zyme® 300 may be mixed in a mobile water trailer 304 outfitted with a water pump 308 having an outlet pipe of a minimum of about 1.5 inches to about 2 inches. The Perma-Zyme® 300 may be mixed in a solution of a ratio of about 1 gallon of Perma-Zyme® 300 multi-enzyme formulation to about 1,000 gallons of water. In this exemplary implementation treating a roadbed of the dimensions of about 1 mile long, about 20 feet wide, and a depth of about 6 inches may require approximately 15 gallons of Perma-Zyme® 300 diluted in about 15,000 gallons of water. The diluted enzyme solution may be applied in three passes at the total rate of about 5.1 quarts of diluted enzyme solution per square yard, or, in metric measurements, about 5.5 liters of diluted enzyme solution per square meter. For lengths of roadbed longer or shorter than the about 1 mile measurement of this non-limiting example, it will be necessary to calculate the amount of Perma-Zyme® 300 in solution required to treat the identified roadbed utilizing the application rate expressed in the non-limiting example given above.

Figure 4:
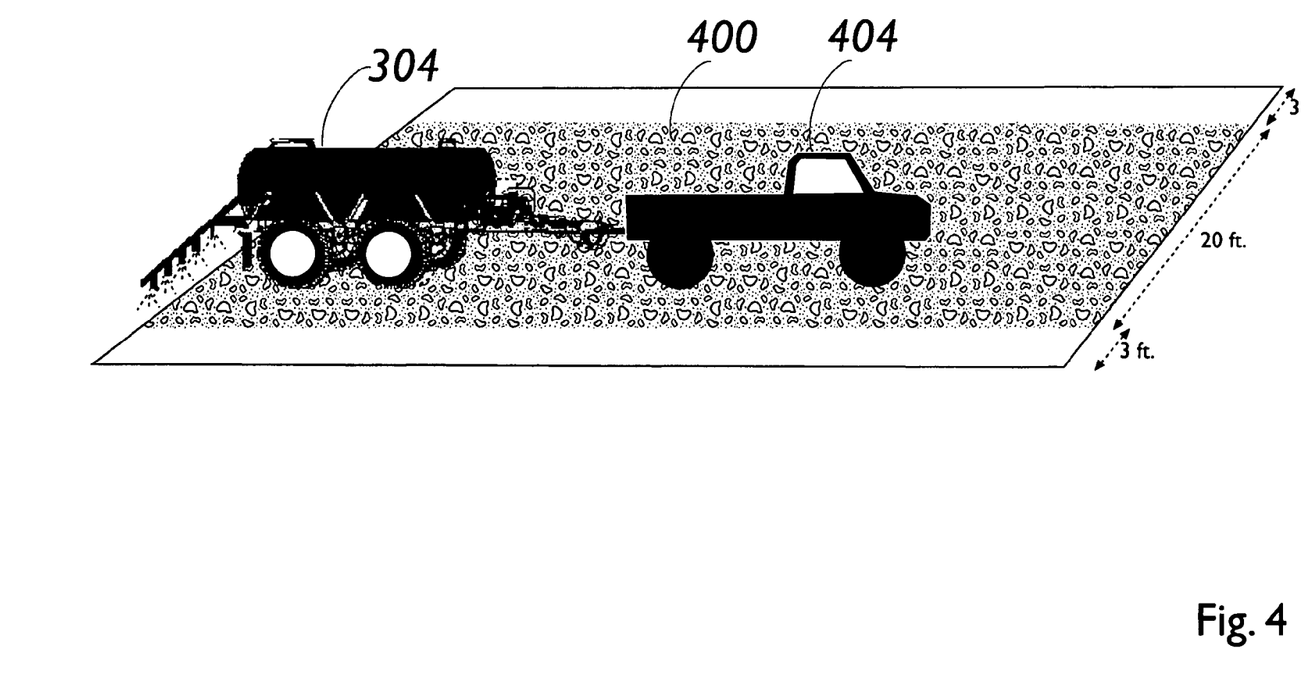
FIG. 4 is an exemplary view of an enzyme formulation topical spray of the roadbed consistent with certain embodiments of the present invention.

Turning to FIG. 4, this figure presents an exemplary implementation of the topical treatment of the roadbed using the enzyme formulation mixture previously prepared. In this non-limiting example the mobile water trailer 304 containing the enzyme formulation mixture is hitched to a truck 404 for positioning within and passage through the roadbed to be treated 400. In an alternative embodiment, the enzyme formulation may be contained within a water truck (not shown) that supports an integral spray attachment for applying the solution within and passage through the roadbed to be treated 400.

Feed the enzyme formulation solution from the water tank 304 to a spray boom 408 and apply the solution to the newly tilled soil at a rate of about 5.1 quarts of diluted enzyme solution per square yard, or, in metric measurements, about 5.5 liters of diluted enzyme solution per square meter. This amount should be applied in three separate passes at a rate of 1.7 quarts per pass, per square yard, or, in metric measurements, 1.83 liters, per pass, per square meter, to saturate the soil of the roadbed 400 approximately 2 inches deep per pass. Continue tilling and applying the enzyme solution until the top 6 inches of the roadbed 400 are saturated with the enzyme formulation solution. If a maximum compaction rate for the soil has not been achieved with the diluted enzyme solution, additional clear, untreated water may be sprayed on the soil to reach the maximum compaction rate for the soil of the roadbed.

Figure 5:
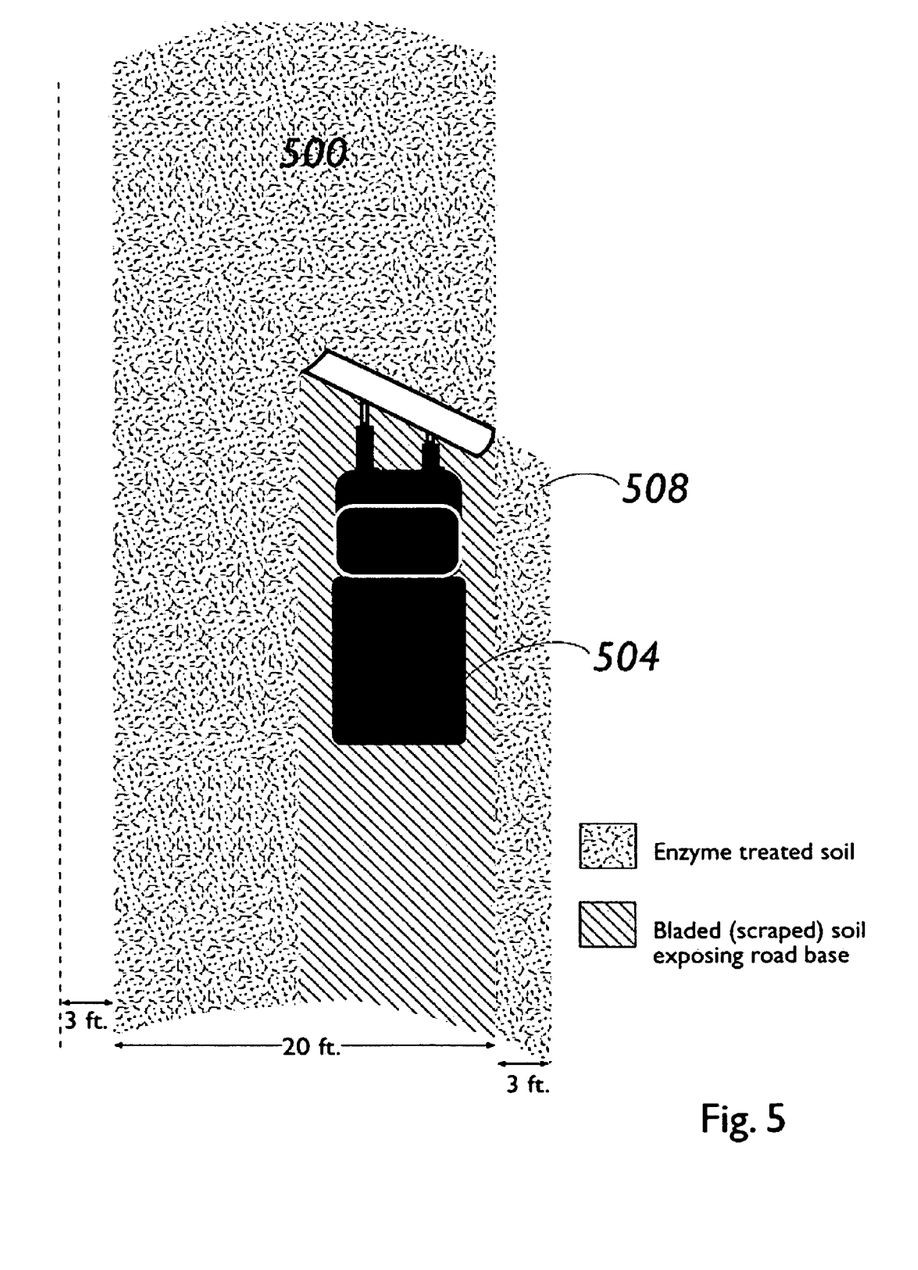
FIG. 5 is a diagram of enzyme amended soil windrow and curing consistent with certain embodiments of the present invention.

Turning to FIG. 5, this figure presents an exemplary view of the enzyme formulation solution amended soil windrow and curing action. In the exemplary implementation, the roadbed treated soil 500 may be scraped from the roadbed using a road grader 504 and cast to either side of the roadbed to produce a windrow of enzyme formulation treated soil 508. The scraping of the enzyme formulation treated soil 500 from the roadbed leaves the solid base of the roadbed exposed. The enzyme formulation treated soil windrows 508 may be left as side cast for up to about 24 hours to allow for the curing of the treated soil, converting the soil particulates into a more compactable and hardened material.

Figure 6:
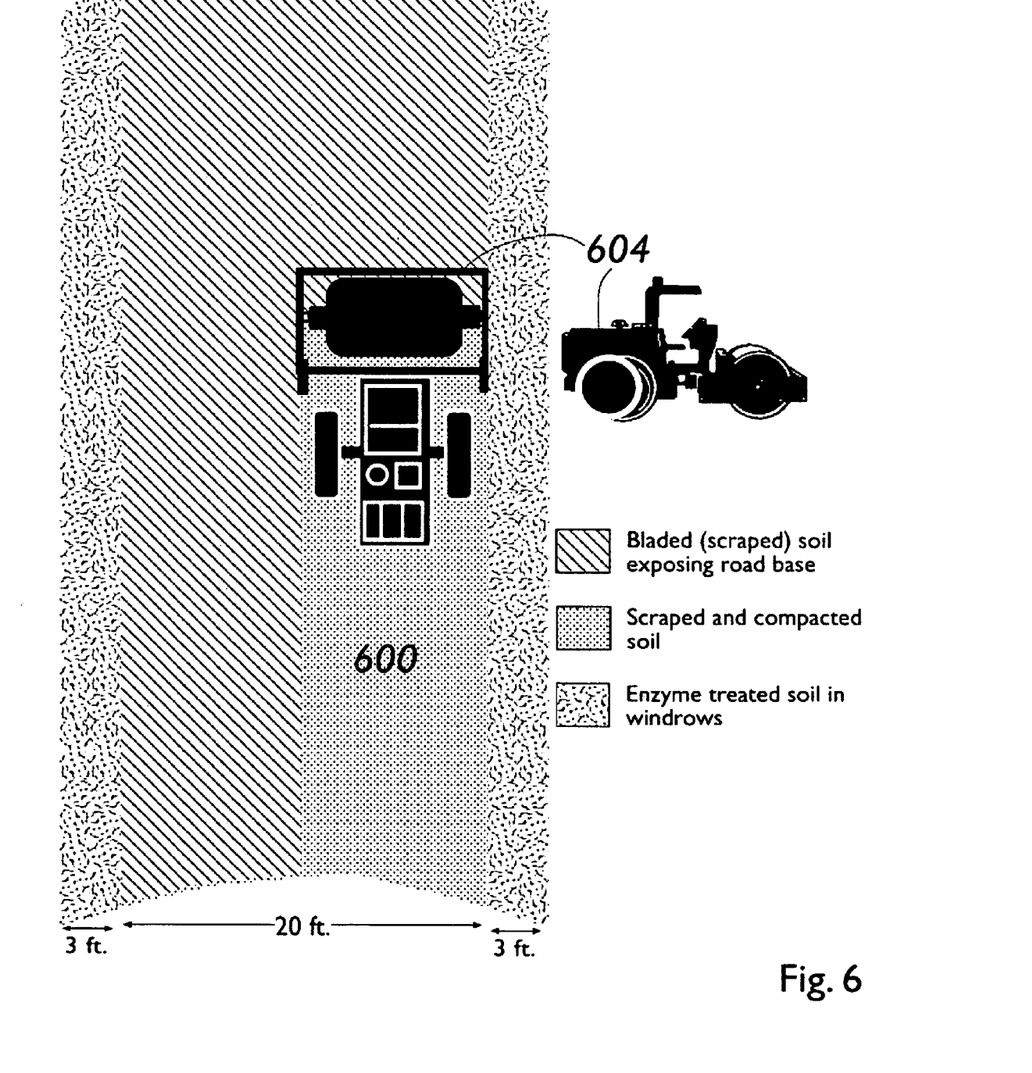
FIG. 6 is an exemplary view of an enzyme amendment and compaction within the roadbed consistent with certain embodiments of the present invention.

Turning to FIG. 6, this figure presents an exemplary view of the further compacting of the soil of the roadbed after the scraping of the enzyme formulation treated soil has been scraped and windrowed. In the exemplary implementation, prior to compacting, and using the road grader 504, the roadbed 600 may be crowned or otherwise sloped such that the roadbed achieves sufficient water drainage to keep water from collecting in the roadbed. A road compactor 604, such as, in a non-limiting example, a 3-ton or greater, rubber-tired road compactor, may be used to compact the newly exposed soil base of the roadbed 600. After an appropriate roadbed compaction, such as achieving a California Bearing Ratio (CBR) value of a minimum of about 2 or higher, the roadbed has been appropriately prepared for the application of an organo-silane formulation for waterproofing.

Figure 7:
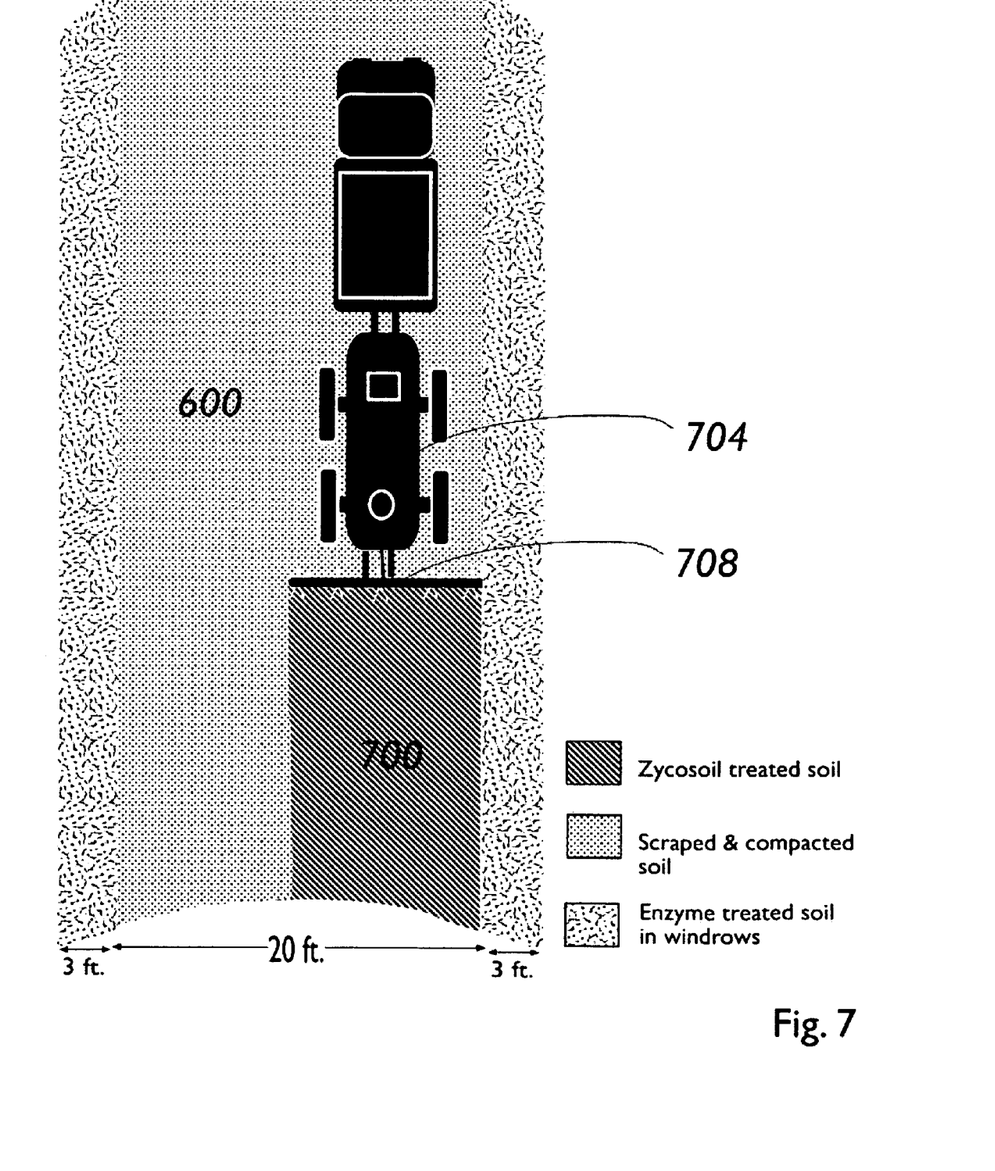
FIG. 7 is an exemplary view of an organo-silane solution amendment and soil compaction in the roadbed consistent with certain embodiments of the present invention.

Turning to FIG. 7, this figure presents an exemplary implementation for the application of an organo-silane formulation to the compacted soil of a roadbed 700. Subsequent to the compaction of the roadbed 600, the soil of the roadbed 600 may be treated with an organo-silane solution to achieve a hydrophobic roadbed base soil. This application may seal the roadbed 700 against the introduction of water through capillary action of the soil. In this exemplary implementation, an organo-silane solution such as, in a non-limiting example, Zycosoil® or Terrasil®, may be used to create a road base that may be greater than 98% water impermeable.

In this exemplary implementation, a first application of the organo-silane solution may begin by preparing a solution in a water truck 704 of about 1 part organo-silane formulation, such as Terrasil®, to 100 parts water. Calculate the amount of the organo-silane formulation that is required by determining the area of the roadbed to be treated at the rate of about 1.8 quarts of diluted organo-silane solution per square yard, or, in metric measurements, about 2 liters of diluted organo-silane solution per square meter. If the same water trailer 704 that was used to mix the enzyme formulation solution is to be used to mix the organo-silane solution, the water trailer 704 tank must first be cleaned by rinsing once with clean water.

To prepare the organo-silane solution, introduce the calculated amount of the organo-silane formulation into a five gallon bucket and fill the rest of the way with water. Stir the organo-silane formulation and water with a mechanical stirring device attached to an electric drill to form a heavy solution. Once in heavy solution form, the mixture may be introduced into the tank of water on the water trailer 704. The solution may then be thoroughly mixed using the circulation pump attached to the water trailer 704.

After the organo-silane solution has been completely mixed, attach a hose from the water tank to a spray boom 708 at the rear of the water trailer 704. Apply the organo-silane solution to the roadbed 600 at the rate of about 2 quarts of diluted organo-silane solution per square yard, or, in metric measurements, about 2 liters of diluted organo-silane solution per square meter. Spray the entire roadbed 600 to be treated and allow the newly treated roadbed 700 to dry for a period of about three hours or more.

After the three hour drying period is complete, a second application of the organo-silane solution will be made. The second application of the organo-silane solution may begin by preparing a solution in a water trailer 704 of about 1 part organo-silane formulation, such as Terrasil®, to 200 parts water. Calculate the amount of the organo-silane formulation that is required by determining the area of the roadbed 700 to be treated a second time at the rate of about 1 quart of diluted organo-silane solution per square yard, or, in metric measurements, about 1 liter of diluted organo-silane solution per square meter.

To prepare the organo-silane solution for the second application, introduce the calculated amount of the organo-silane formulation into a five gallon bucket and fill the rest of the way with water. Stir the organo-silane formulation and water with a mechanical stirring device attached to an electric drill to form a heavy solution. Once in heavy solution form, the mixture may be introduced into the tank of water on the water trailer 704. The solution may then be thoroughly mixed using the circulation pump attached to the water trailer 704.

After the organo-silane solution has been completely mixed, attach a hose from the water tank to a spray boom 708 at the rear of the water trailer 704. Apply the organo-silane solution to the roadbed 700 at the rate of about 1 quart of diluted organo-silane solution per square yard, or, in metric measurements, about 1 liter of diluted organo-silane solution per square meter. Spray the entire roadbed 700 to be treated and allow the roadbed to dry for a period of about 12 hours.

Figure 8:
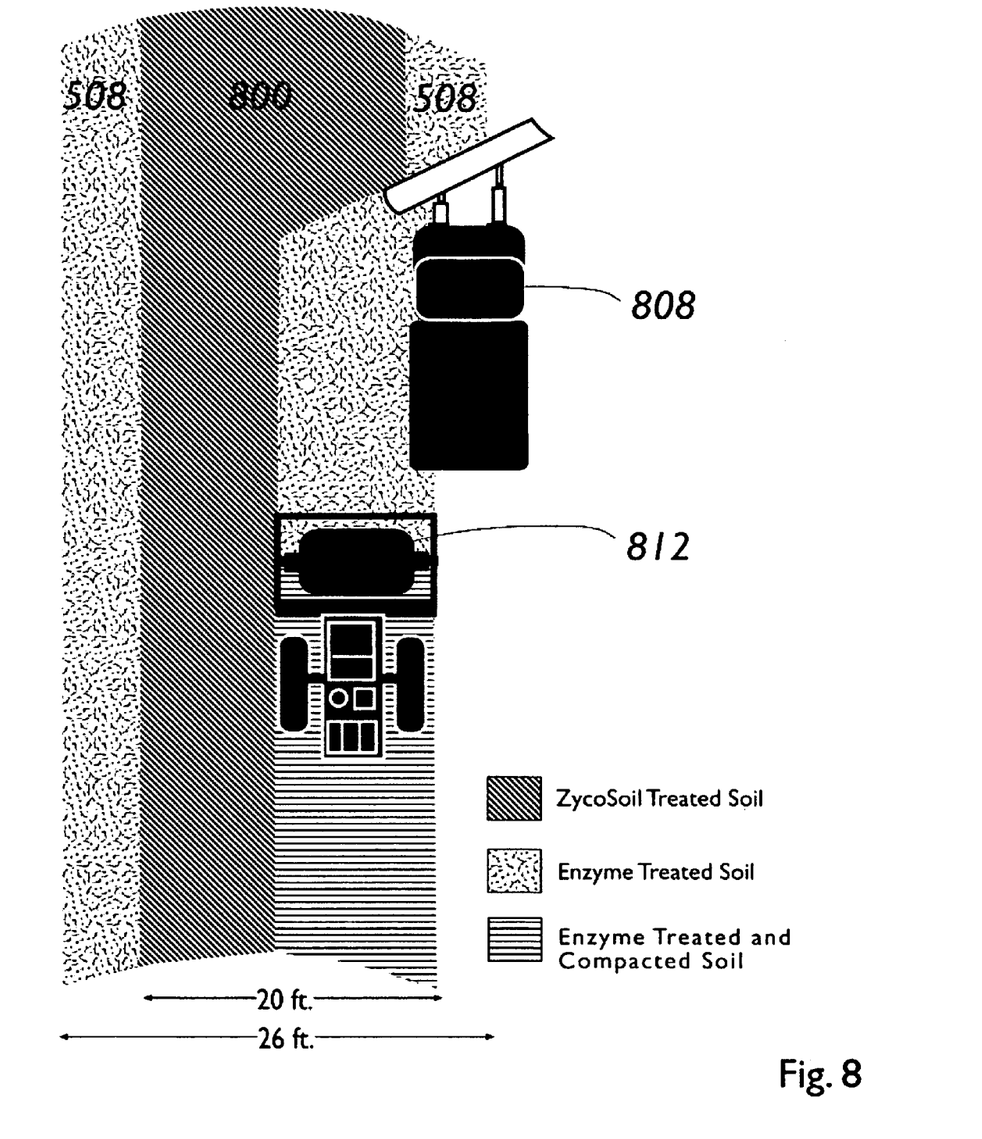
FIG. 8 is an exemplary view of reintroduction of enzyme amended soil and compaction with organo-silane treated soil in the roadbed consistent with certain embodiments of the present invention.

Turning to FIG. 8, this figure presents an exemplary implementation for the replacement of the enzyme formulation treated soil within the roadbed and compaction of the soil. In this exemplary implementation, after the organo-silane treated roadbed 800 has dried for the specified time, the enzyme formulation treated soil 508 that was placed in windrows to either side of the roadbed 800 may be replaced within the roadbed 800. The replacement of the enzyme formulation treated soil 508 may be performed by introducing the enzyme formulation treated soil 508 into the roadbed 800 at about two inches at a time. The enzyme formulation treated soil 508 may be scraped onto the roadbed 800 using a road grader 808. The approximately 2 inch layer of soil may then be bladed and crowned using the road grader 808, and the layer of soil then compressed using the road compactor 812. Compression of the enzyme formulation treated soil 508 may take several passes of the roller depending on its weight. If the enzyme formulation treated soil 508 has dried to a point beyond the moisture required to achieve maximum soil compaction, an operator may wet the enzyme formulation treated soil 508 again, and if necessary, use an even more diluted solution of the enzyme mixture to return the enzyme formulation treated soil 508 to the desired consistency. These steps are then repeated for each additional 2 inch layer of enzyme formulation treated soil 508 until all of the enzyme formulation treated soil 508 has been replaced within the roadbed 800 and has been crowned, bladed, and compacted to create an appropriate water drainage slope.

Figure 9:
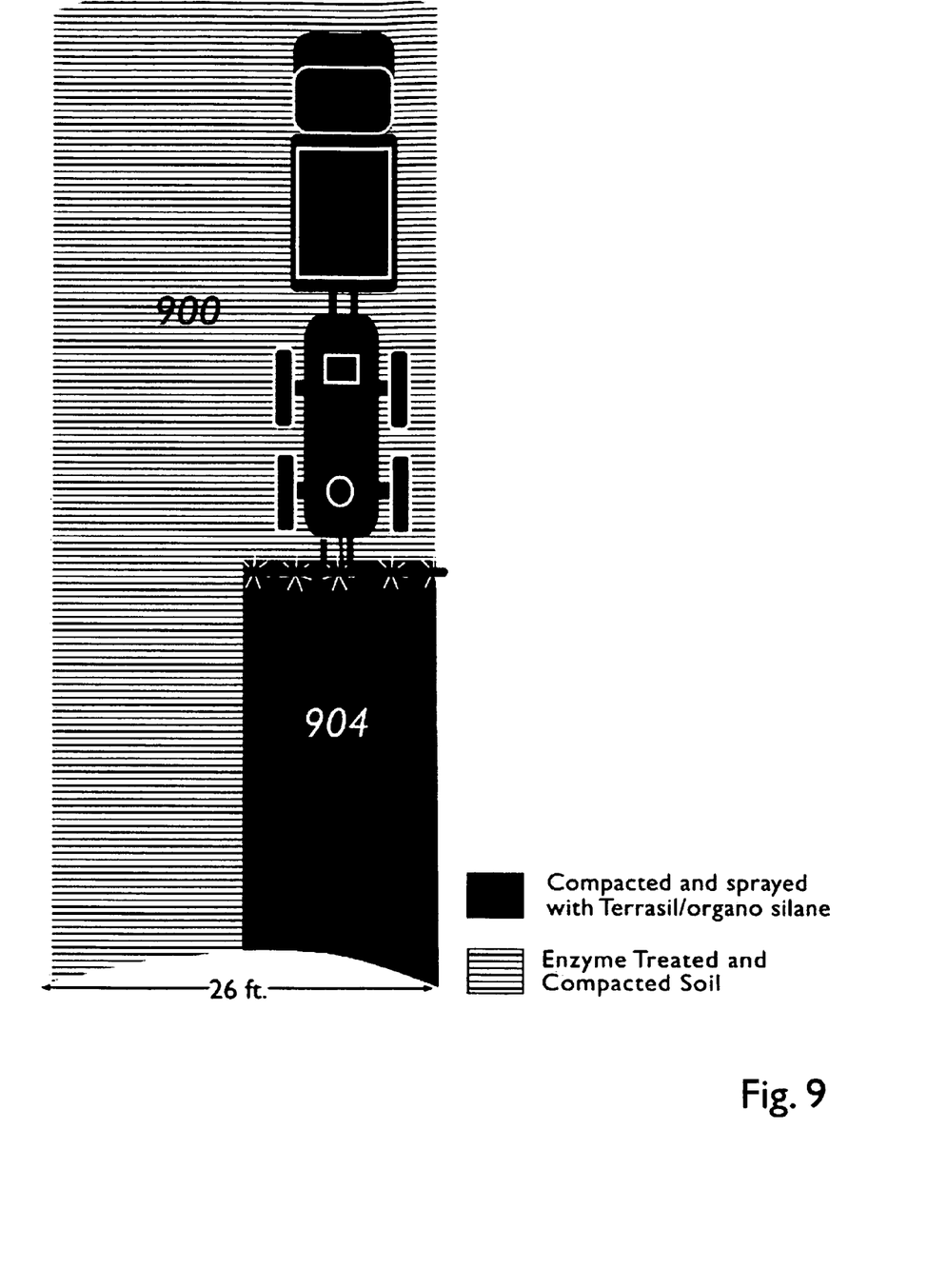
FIG. 9 is an exemplary view of organo-silane surface treatment and soil compaction in the roadbed consistent with certain embodiments of the present invention.

Turning to FIG. 9, this figure presents an exemplary implementation for compaction and over-spraying of the roadbed to complete the hydrophobic soil envelope of the enzyme treated roadbed 900. In this exemplary implementation, when the replacement of the enzyme formulation treated soil is complete, it must be compacted and allowed to thoroughly dry for 48 hours. This additional drying time brings the total drying time to 72 hours. Once the enzyme formulation treated soil is dried and hardened, an additional application of the organo-silane formulation may be used to seal the waterproof envelope of the treated roadbed 904 by applying the organo-silane formulation back over the top of the enzyme formulation treated soil of the treated roadbed 900.

In the exemplary implementation, the organo-silane formulation is once again applied to the roadbed 900 in two applications—a first application with a 100 parts water:1 part organo-silane mixture and the second application with a 200 parts water:1 organo-silane mixture. The mixture and application actions are performed in the same fashion as described previously. During the application of the organo-silane mixture to the roadbed 900, the surface area extending 3 feet on either shoulder of the roadbed 900 may also be topically sprayed twice with Terrasil® to prevent water intrusion from the sides of the road.

Figure 10:
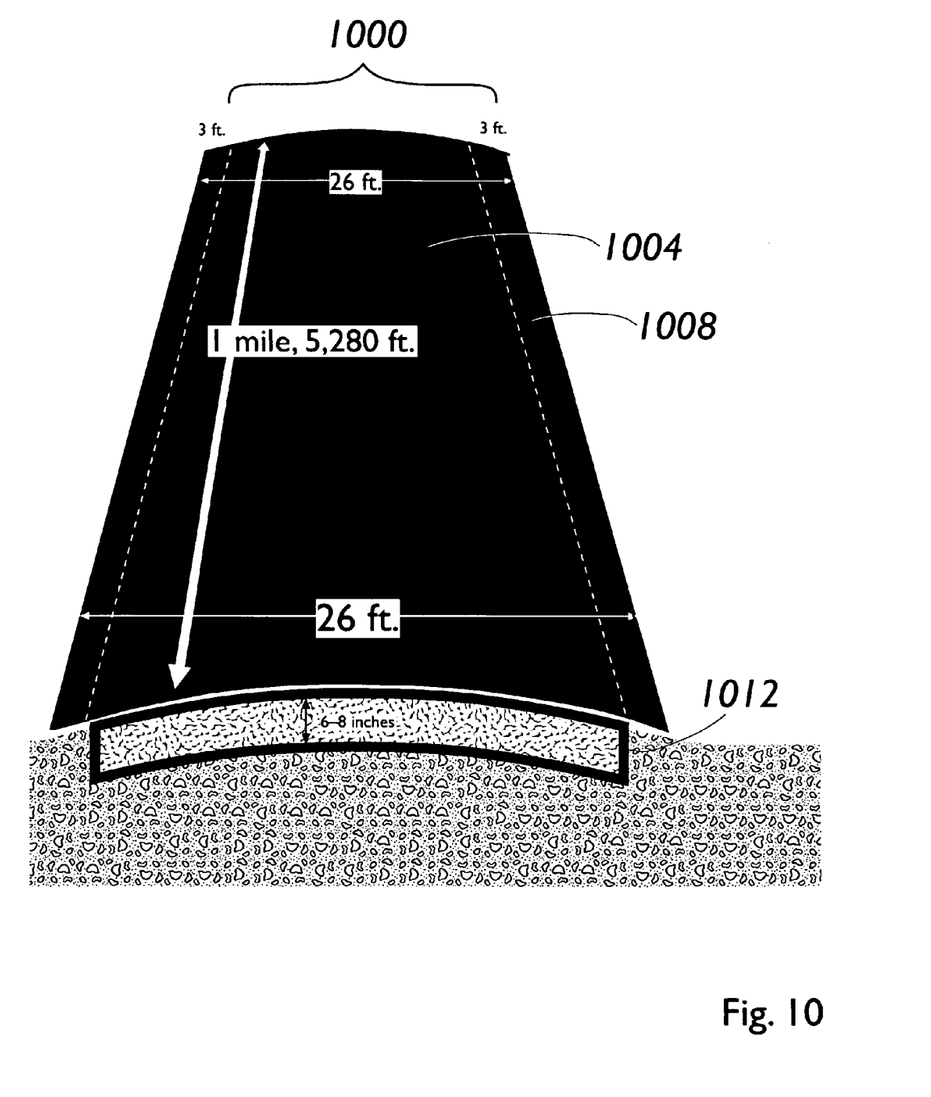
FIG. 10 is a representation of a completed roadbed consistent with certain embodiments of the present invention.

Turning to FIG. 10, this figure presents an exemplary view of the finished roadbed. In this exemplary implementation, the finished roadbed 1000 of the dimensions of approximately 26 feet wide by 1 mile long, is composed of a central finished roadbed 1004 approximately 20 feet wide with two shoulders 1008, each being three feet in width. The central finished roadbed 1004 may consist of a surface treated with the organo-silane mixture that extends to a three foot wide shoulder 1008 on each side of the central finished roadbed 1004. The central finished roadbed 1004 is positioned on top of the envelop of soil 1012 that has been treated in layers consisting of A) a base layer of soil treated by the organo-silane mixture, B) a layer of approximately six inches of soil that has been treated by the enzyme formulation, and C) a top layer that again has been treated by the organo-silane mixture. The treated envelop of soil 1012 is about six to eight inches deep forming a roadbed that is about 98% or more hydrophobic and prevents the introduction of water due to both precipitation and capillary action of the soil to the roadbed.

Figure 11:
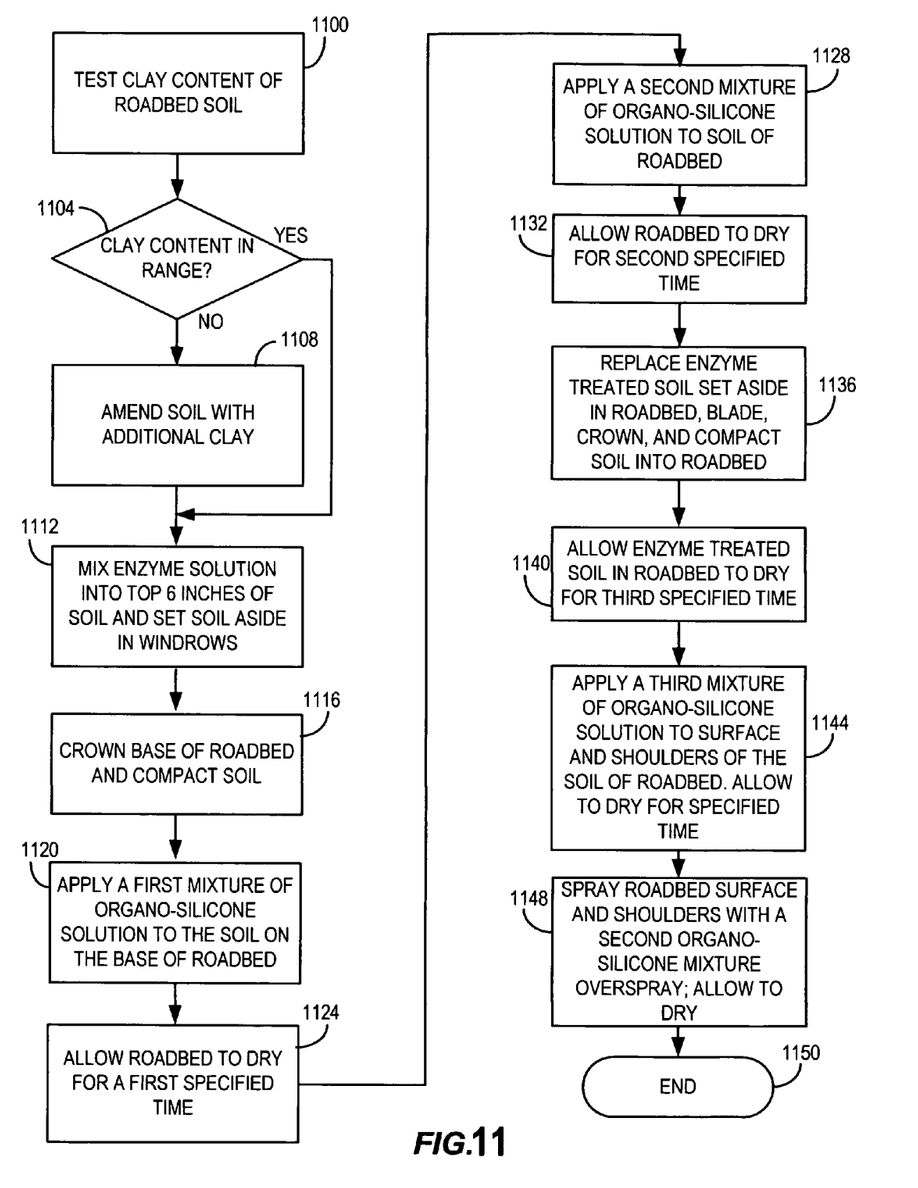
FIG. 11 is a diagram of a process flow for the roadbed treatment consistent with certain embodiments of the present invention.

Turning to FIG. 11, this figure presents a diagram of a process flow for the DUROEARTH roadbed treatment. In the exemplary implementation, the process begins at 1100 with testing the clay content of the soil in the roadbed that is to be subject to the DUROEARTH treatment to determine if the clay content is within the range of treatment for this process. By way of example, when using a multi-enzyme formulation compound the preferred clay content of the soil is a minimum of about 12%. At 1104, if the clay content falls below this exemplary range, clay must be added to bring the clay content of the soil to within the minimum required range at 1108. If the clay content of the roadbed soil is within the preferred range, the roadbed soil is ready to begin treatment.

At 1112, in the exemplary implementation, an enzyme or polymer formulation may be used to treat the soil of the roadbed to begin the process of rendering the roadbed soil highly compacted and hardened. By way of example, the enzyme formulation of Perma-Zyme® may be mixed to a formulation of about 1 gallon of the enzyme formulation to about 1,000 gallons of water. This solution is then mixed into about the top 6 inches to 12 inches of soil making up the roadbed. The roadbed soil treated with the enzyme formulation may then be scraped off of the roadbed by a road grader and set aside as windrows at either side of the roadbed and allowed to cure for approximately 24 hours. At 1116, the roadbed may then be crowned, scraped and compacted to form a slope within the roadbed to allow for its proper drainage.

A first mixture of an organo-silane formulation of approximately 1 part organo-silane compound to 100 parts water may be prepared and applied to the crowned and compacted roadbed at 1120. At 1124, the roadbed must then be allowed to dry for a first time period of at least three hours before further amendments to the roadbed soil occur. After the first time period has elapsed, at 1128 a second mixture of the organo-silane formulation, consisting of approximately 1 part of the organo-silane compound to 200 parts water, may be prepared and applied to the crowned and compacted roadbed. At 1132, the roadbed is allowed to dry for a second time period of approximately twelve hours.

At 1136, after the drying time has elapsed, the enzyme treated soil previously set aside in windrows may now be replaced within the roadbed. This process involves layering the enzyme treated soil on top of the organo-silane treated soil that has been crowned and compacted within the roadbed. The enzyme treated soil should be layered onto the roadbed surface in stages. Each stage should include the replacement of approximately 2 inches of enzyme treated soil onto the organo-silane treated roadbed, and this soil should be crowned and compacted until all of it has been replaced. The enzyme treated soil should approach a 95% compaction rate. At 1140, after all of the previously reserved enzyme treated soil has been returned to the roadbed, crowned, scraped and compacted, the enzyme treated soil may be allowed to dry in place for about 48 hours. At 1144, at the conclusion of the drying time, a third application of the organo-silane formulation to the top surface of the enzyme treated soil of the roadbed may be made in two steps. A first step will apply the organo-silane formulation at a dilution of about 1 part organo-silane compound to 100 parts water and allow the roadbed to dry for a minimum of three hours. The second step will apply the organo-silane formulation at a dilution of about 1 part organo-silane compound to 200 parts water and allow the roadbed to dry for about 12 hours. Included in the process at 1148, are the shoulders of the roadbed, which extend three feet to either side of the roadbed proper, that may be sprayed with the organo-silane formulation at the same dilution rates as the roadbed, or about 1 part organo-silane compound to 100 parts water and later, one part organo-silane compound to 200 parts water. At 1150, after all layers of enzyme and organo-silane treated soils have been properly dried, scraped, crowned and compacted and the shoulders of the roadbed have been treated with an application of the organo-silane formulation at the desired dilution, the roadbed is complete and should be hardened and about 98% or more hydrophobic, protecting the encased, finished roadbed against erosion or damage from the introduction of water by either precipitation or capillary action of the soil.

While certain illustrative embodiments have been described, it is evident that many alternatives, modifications, permutations and variations will become apparent to those skilled in the art in light of the foregoing description.

What is claimed is:

1. A system for hardening and rendering a roadbed water resistant comprising:
   ensuring the clay content of the roadbed soil is within a pre-determined range;
   treating the top six inches of the roadbed soil with an enzyme formulation and removing and setting aside the treated roadbed soil;
   applying a first mixture of organo-silane solution to soil remaining in the roadbed and allowing a first cure time period;
   applying a second mixture of organo-silane solution to soil remaining in the roadbed after the first cure time period and allowing a second cure time period;
   replacing the previously set aside enzyme treated roadbed soil and allowing to cure for a third time period;

applying the first and second mixtures of the organo-silane solution to the roadbed and shoulders of the roadbed forming a hardened and water resistant envelope of soil within the roadbed.

2. A system as in claim 1, where the clay content of the roadbed soil is within the range containing a minimum of about 12% clay content.

3. A system as in claim 2, where if the clay content is less than about 12%, clay amendments are added to the roadbed soil to bring the clay content into the desired range.

4. A system as in claim 1, where the first cure time period is a minimum of three hours.

5. A system as in claim 1, where the second cure time period is a minimum of 12 hours.

6. A system as in claim 1, where the third cure time period is a minimum of 48 hours.

7. A system as in claim 1, where the enzyme solution is mixed into the roadbed soil during application.

8. A system as in claim 1, where the roadbed soil is crowned and compacted after each application of the enzyme solution.

9. A system as in claim 1, where the enzyme formulation solution is applied at a rate of about 5.1 quarts of diluted enzyme solution per square yard, or, in metric measurements, about 5.5 liters of diluted enzyme solution per square meter.

10. A system as in claim 1, where:
the first mixture of the organo-silane solution is applied at a rate of about 2 quarts of diluted organo-silane solution per square yard, or, in metric measurements, about 2 liters of diluted organo-silane solution per square meter; and
the second mixture of the organo-silane solution is applied at a rate of about 1 quart of diluted organo-silane solution per square yard, or, in metric measurements, about 1 liter of diluted organo-silane solution per square meter.

11. A process for hardening and rendering a roadbed water resistant comprising:
ensuring the clay content of the roadbed soil is within a pre-determined range;
treating the top six inches of the roadbed soil with an enzyme formulation and removing and setting aside the treated roadbed soil;
applying a first mixture of organo-silane solution to soil remaining in the roadbed and allowing a first cure time period;
applying a second mixture of organo-silane solution to soil remaining in the roadbed after the first cure time period and allowing a second cure time period;
replacing the previously set aside enzyme treated roadbed soil and allowing to cure for a third time period;
applying a final mixture of the organo-silane solution to the roadbed and shoulders of the roadbed forming a hardened and water resistant envelope of soil within the roadbed.

12. A process as in claim 11, where the clay content of the roadbed soil is at a minimum of about 12% clay content.

13. A process as in claim 12, where if the clay content is less than about 12%, clay amendments are added to the roadbed soil to bring the clay content into the desired range.

14. A process as in claim 11, where the first cure time period is a minimum of three hours.

15. A process as in claim 11, where the second cure time period is a minimum of 12 hours.

16. A process as in claim 11, where the third cure time period is a minimum of 48 hours.

17. A process as in claim 11, where the enzyme solution is mixed into the roadbed soil during application.

18. A process as in claim 11, where the roadbed soil is crowned and compacted after each application of the enzyme solution.

19. A process as in claim 11, where the enzyme formulation solution is applied at a rate of about 5.1 quarts of diluted enzyme solution per square yard, or, in metric measurements, about 5.5 liters of diluted enzyme solution per square meter.

20. A process as in claim 11, where:
the first mixture of the organo-silane solution is applied at a rate of about 2 quarts of diluted organo-silane solution per square yard, or, in metric measurements, about 2 liters of diluted organo-silane solution per square meter; and
the second mixture of the organo-silane solution is applied at a rate of about 1 quart of diluted organo-silane solution per square yard, or, in metric measurements, about 1 liters of diluted organo-silane solution per square meter.

* * * * *